US011878737B2

(12) United States Patent
Schantl et al.

(10) Patent No.: US 11,878,737 B2
(45) Date of Patent: Jan. 23, 2024

(54) FASTENING ASSEMBLY HAVING A BEARING BRACKET FOR FASTENING AN AXLE CARRIER, AND METHOD FOR MOUNTING AN AXLE CARRIER

(71) Applicants: AUDI AG, Ingolstadt (DE); DR. ING. H.C. F. PORSCHE AG, Stuttgart (DE)

(72) Inventors: Gilbert Schantl, Munich (DE); Thomas Artner, Neuburg (DE); Hans-Peter Frensch, Ingolstadt (DE); Marek Bujak, Wellheim (DE); Thomas Wittenschläger, Ingolstadt (DE); Stefan Rugies, Ingolstadt (DE); Thomas Achleitner, Weil der Stadt (DE)

(73) Assignees: AUDI AG, Ingolstadt (DE); DR. ING. H.C. F. PORSCHE AG, Stuttgart (DE)

( * ) Notice: Subject to any disclaimer, the term of this patent is extended or adjusted under 35 U.S.C. 154(b) by 0 days.

(21) Appl. No.: 17/913,242

(22) PCT Filed: Mar. 23, 2021

(86) PCT No.: PCT/EP2021/057352
§ 371 (c)(1),
(2) Date: Sep. 21, 2022

(87) PCT Pub. No.: WO2021/239289
PCT Pub. Date: Dec. 2, 2021

(65) Prior Publication Data
US 2023/0114926 A1    Apr. 13, 2023

(30) Foreign Application Priority Data

May 25, 2020    (DE) .................... 10 2020 113 946.2

(51) Int. Cl.
*B62D 27/06*    (2006.01)
*B62D 21/11*    (2006.01)
*B62D 65/12*    (2006.01)

(52) U.S. Cl.
CPC ............ *B62D 27/065* (2013.01); *B62D 21/11* (2013.01); *B62D 65/12* (2013.01)

(58) Field of Classification Search
CPC ....... B62D 27/065; B62D 21/11; B62D 65/12
See application file for complete search history.

(56) References Cited

U.S. PATENT DOCUMENTS 10,071,766 B2 * 9/2018 Chapple ................. B62D 21/02
10,689,034 B2 * 6/2020 Schmalzrieth ......... B62D 21/02
(Continued)

FOREIGN PATENT DOCUMENTS

| CN | 106394686 A | 2/2017 |
|---|---|---|
| DE | 4141089 A1 | 6/1993 |

(Continued)

OTHER PUBLICATIONS

Examination Report dated Mar. 15, 2021, in corresponding German Application No. 10 2020 113 946.2, 8 pages.
(Continued)

*Primary Examiner* — Jason D Shanske
*Assistant Examiner* — Matthew James O'Neill
(74) *Attorney, Agent, or Firm* — Maier & Maier, PLLC

(57) ABSTRACT

A fastening assembly for fastening an axle support on a vehicle body. The axle support is screwed onto the vehicle body on multiple attachment points. On at least one of the attachment points, a bearing bracket for mounting a unit for the axle drive is arranged between the axle support and the vehicle body and also screwed on. A method for installing and fastening an axle support on a vehicle body in the mass production of motor vehicles is further disclosed.

10 Claims, 1 Drawing Sheet

(56) References Cited

U.S. PATENT DOCUMENTS

| | | | | |
|---|---|---|---|---|
| 2016/0082827 | A1* | 3/2016 | Koenig | B60G 3/20 |
| | | | | 180/60 |
| 2017/0210429 | A1 | 7/2017 | Isakiewitsch | |
| 2018/0201322 | A1 | 7/2018 | Schmalzrieth | |
| 2020/0307698 | A1* | 10/2020 | Kawai | B62D 21/03 |

FOREIGN PATENT DOCUMENTS

| | | |
|---|---|---|
| DE | 102012012327 A1 | 12/2013 |
| DE | 102016208721 A1 | 12/2016 |
| DE | 102016000670 B3 | 1/2017 |
| DE | 102017200853 A1 | 7/2018 |
| DE | 102017214955 A1 | 2/2019 |
| DE | 102014108638 B4 | 3/2019 |
| DE | 102018131447 A1 | 6/2019 |
| DE | 102013001668 B4 | 10/2019 |
| DE | 102018205799 A1 | 10/2019 |

OTHER PUBLICATIONS

International Preliminary Report on Patentability dated Nov. 17, 2022 and Written Opinion dated Jul. 1, 2021, in corresponding International Application No. PCT/EP2021/057352, 20 pages.
International Search Report dated Jul. 1, 2021, in corresponding International Application No. PCT/EP2021/057352, 6 pages.
First Office Action dated Jul. 26, 2023, in corresponding Chinese Application No. 202180027993.X, 35 pages.

* cited by examiner

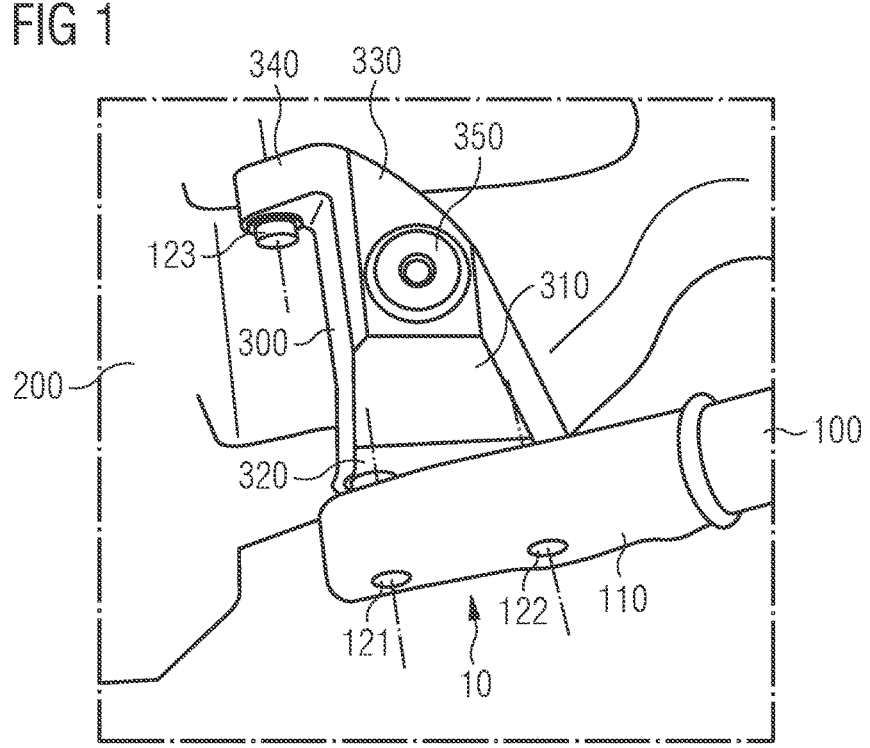
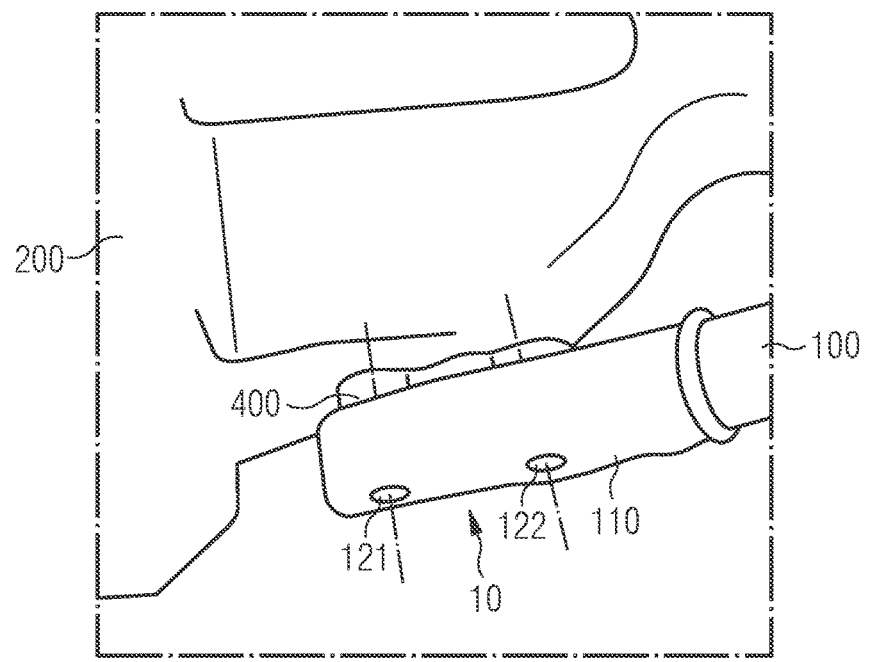

FASTENING ASSEMBLY HAVING A BEARING BRACKET FOR FASTENING AN AXLE CARRIER, AND METHOD FOR MOUNTING AN AXLE CARRIER

FIELD

The invention relates to a fastening assembly for fastening of an axle support on a vehicle body. The invention furthermore relates to a method for installing and fastening an axle support.

BACKGROUND

Units for an axle drive, e.g., an electric motor, a differential gear, or the like, can be partially or completely mounted on the axle support (auxiliary frame) of a vehicle axle, which is designed accordingly for this purpose.

DE 10 2017 200 853 A1 describes an auxiliary frame (1) for a motor vehicle having at least two bearing elements (9) for attaching a unit to the auxiliary frame (1). The unit can be, for example, an electric motor or a battery of a hybrid or electric vehicle. However, mounting a differential gear or the like via the bearing elements (9) on the auxiliary frame (1) can also be provided. The bearing elements (9) are located on bearing brackets (6, 7), which are to be screwed or welded onto a support (4) of the auxiliary frame (1).

SUMMARY

A further possibility for mounting a unit for an axle drive is to be provided by the invention, which simplifies the production logistics in particular in the mass production of vehicle models, which are offered with both single-axle drive and dual-axle drive.

This is achieved by the fastening assembly according to the invention. With the concurrent claim, the invention also extends to a method for installing and fastening an axle support in mass production. Additional features result similarly for both subject-matters of the invention from the following description of the invention, and the figures.

The fastening assembly according to the invention (axle fastening assembly) for fastening an axle support (auxiliary frame) on a vehicle body, wherein the axle support is screwed onto the vehicle body on multiple attachment or connecting points, but on at least one attachment or connecting point, is characterized in that, on at least one attachment point, a bearing bracket for mounting a unit for the axle drive is arranged or inserted between the axle support and the vehicle body and also screwed on.

The axle drive assembly to be mounted is in particular a drive machine, for example an electric machine, or a gearing, for example a differential gear.

The invention enables in a relatively simple manner the fastening of a bearing bracket formed as a separate component for an axle drive unit, wherein this bearing bracket can only be installed or mounted when the relevant vehicle axle is to be equipped with an axle drive. If no axle drive is provided, a spacer element or spacer part can be installed, as explained in more detail hereinafter. The production logistics are thus significantly simplified. In the mass production of a specific vehicle model, the axle support to be installed for the relevant vehicle axle can be formed identically independently of an axle drive optionally to be provided, so that a production control of the large and bulky axle supports is dispensed with. Furthermore, the material use is decreased and costs are reduced.

The fastening on the attachment point can be carried out by means of two screws or the like, which each form one fastening point, so that not only longitudinal and transverse forces, but also torques or tilting moments can be supported at the attachment point.

The bearing bracket preferably has a first fastening section, which is arranged between the axle support and the vehicle body and also screwed on, in particular by means of two screws, and a second fastening section, which is additionally screwed onto the vehicle body, in particular by means of only one screw. The bearing bracket is formed in particular as an angled part, having a first leg on which the first fastening section is located and having a second leg on which the second fastening section is located.

The bearing bracket can have at least one bearing element, for example, a rubber-metal bearing, for the attachment of the unit, which element is arranged in particular on the second leg. The bearing bracket is preferably formed, in particular on the second leg, having a receptacle for the bearing element.

The bearing bracket is preferably formed in one piece as a cast part (i.e., as a metal cast part), in particular as a light metal cast part, or as an FRP part (i.e., as a fiber-reinforced plastic part). The bearing bracket can also be formed in multiple pieces, for example, as a steel or aluminum welded part.

The method according to the invention for installing and fastening an axle support on a vehicle body in the mass production of motor vehicles, in particular in the mass production of a specific vehicle model, which is manufactured with both single-axle drive and dual-axle drive, wherein the axle support is screwed onto the vehicle body on multiple attachment points, but at least on one attachment point, comprises the following steps:

providing an axle support from a set or a stock of identical axle supports;

if necessary, installing components to be fastened on the axle support, for example, steering components, chassis components, and the like;

inserting the axle support into the (also provided) vehicle body and if necessary, aligning the axle support relative to the vehicle body;

fastening the axle support on the vehicle body, wherein, on at least one attachment point, either a bearing bracket for mounting a unit for the axle drive is arranged or inserted between the axle support and the vehicle body and also screwed on (as explained above), if an axle drive is provided for the relevant vehicle axle, or, on the same attachment point between the axle support and the vehicle body, a spacer part is arranged or inserted and also screwed on, if no axle drive is provided for the relevant vehicle axle.

The following can optionally be provided:

placing or pre-installing at least one unit for the axle drive on the axle support (before the axle support is inserted into the vehicle body), if an axle drive is provided for the relevant vehicle axle, wherein this unit (after the insertion of the axle support into the vehicle body) is then supported or mounted, during the fastening of the axle support on the vehicle body, on at least one bearing bracket, which, according to the invention, is arranged or inserted between the axle support and the vehicle body and also screwed on (see above).

The method according to the invention thus provides that during the installation or fastening of an axle support, a case differentiation is made and, as the case may be, a bearing bracket or a spacer part is mounted or installed on at least one attachment point, depending on whether an axle drive is provided for the relevant vehicle axle or not.

The spacer part or spacer element formed as a separate component has the same attachment or connection dimensions with respect to the attachment point as the bearing bracket. The spacer part is preferably a one-piece cast part, in particular a light metal cast part, or an FRP part.

The bearing bracket can already be fastened or preinstalled on the unit to be mounted, which is in particular an electric machine or a differential gear (see above), so that the bearing bracket forms a structural unit together with the unit. This simplifies the production logistics and the installation effort.

BRIEF DESCRIPTION OF THE FIGURES

The invention is explained in more detail hereinafter on the basis of the figures. The features shown in the figures and/or explained hereinafter can be general features of the invention, also independently of specific combinations of features, and can refine the invention accordingly.

FIG. 1 shows an attachment point equipped according to the invention with a bearing bracket for fastening an axle support on a vehicle body.

FIG. 2 shows the same attachment point having a spacer part.

DETAILED DESCRIPTION

The support end 110 of an axle support (auxiliary frame) 100 shown in FIG. 1 is screwed onto a vehicle body 200 at the attachment point 10 by means of two through screws 121, 122. A bearing bracket 300 for mounting a unit for the axle drive is arranged between the axle support 100 or the support end 110 and the vehicle body 200 and is also screwed on. The two fastening screws 121, 122, which are spaced apart from one another, protrude through a first fastening section 320 of the bearing bracket 300, which is thus quasi-clamped between the support end 110 and the vehicle body 200. The bearing bracket 300 is additionally screwed onto the vehicle body 200 at a second fastening section 340. This additional screw connection 123 is also used as an auxiliary screw connection during the installation.

The bearing bracket 300 is formed as an angled part and has a first leg 310 on which the first fastening section 320 is located and a second section 330 on which the second fastening section 340 is located.

A bearing element 350 for attaching the unit to be mounted, which is in particular an electric machine or a differential gear, is also located on the second leg 330.

The attachment variant shown in FIG. 1 is provided for a vehicle axle having axle drive. FIG. 2 shows the same attachment point 10, wherein instead of the bearing bracket 300, a spacer element 400 is arranged between the axle support 100 or the support end 110 and the vehicle body 200 and also screwed on. This attachment variant is provided for a vehicle axle without axle drive.

The invention claimed is:

1. A fastening assembly comprising:
an axle support configured to be fastened to a vehicle body at multiple attachment points,
a bearing bracket configured to mount an axle drive and arranged between the axle support and the vehicle body, the bearing bracket further comprising:
a first fastening section configured to connect the bearing bracket to the vehicle body at two spaced apart locations, and
a second fastening section configured to connect the bearing bracket to the vehicle body, wherein the first fastening section is separate from and angled relative to the second fastening section and the second fastening section is connected by only one screw.

2. The fastening assembly as claimed in claim 1, further comprising:
at least two fastening screws.

3. The fastening assembly as claimed in claim 1, wherein the bearing bracket is formed as an angled part, having a first leg on which the first fastening section is located and having a second leg on which the second fastening section is located.

4. The fastening assembly as claimed in claim 3, wherein the bearing bracket further comprises:
at least one bearing element.

5. The fastening assembly as claimed in claim 1, wherein the bearing bracket is formed in one piece as a cast part or a Fiber-Reinforced Plastic (FRP) part.

6. The fastening assembly as claimed in claim 2, wherein the bearing bracket is formed in one piece as a cast part or a Fiber-Reinforced Plastic (FRP) part.

7. The fastening assembly as claimed in claim 3, wherein the bearing bracket is formed in one piece as a cast part or a Fiber-Reinforced Plastic (FRP) part.

8. The fastening assembly as claimed in claim 4, wherein the bearing bracket is formed in one piece as a cast part or a Fiber-Reinforced Plastic (FRP) part.

9. A method for installing and fastening an axle support on a vehicle body in mass production of motor vehicles, wherein the axle support is screwed onto the vehicle body on multiple attachment points, comprising:
providing the axle support from a set of identical axle supports;
inserting the axle support into the vehicle body;
fastening the axle support on the vehicle body, wherein, on at least one attachment point, a bearing bracket for mounting a unit for the axle drive is arranged between the axle support and the vehicle body and screwed onto the vehicle body, and the bearing bracket comprises a first fastening section configured to connect the bearing bracket to the vehicle body at two spaced apart locations, and a second fastening section configured to connect the bearing bracket to the vehicle body, wherein the first fastening section is separate from and angled relative to the second fastening section and the second fastening section is connected by only one screw.

10. The method as claimed in claim 9, wherein the bearing bracket is preinstalled.

* * * * *